April 6, 1954  R. N. KNOSP ET AL  2,674,706
AUTOMATIC TRAVERSE AND POSITIONING APPARATUS FOR MACHINE TOOLS
Filed June 10, 1950  10 Sheets-Sheet 1

INVENTORS.
Robert N. Knosp
BY Carl E. Linden
Frank O. Wetzel
Wood, Arey, Herron & Evans
ATTORNEYS.

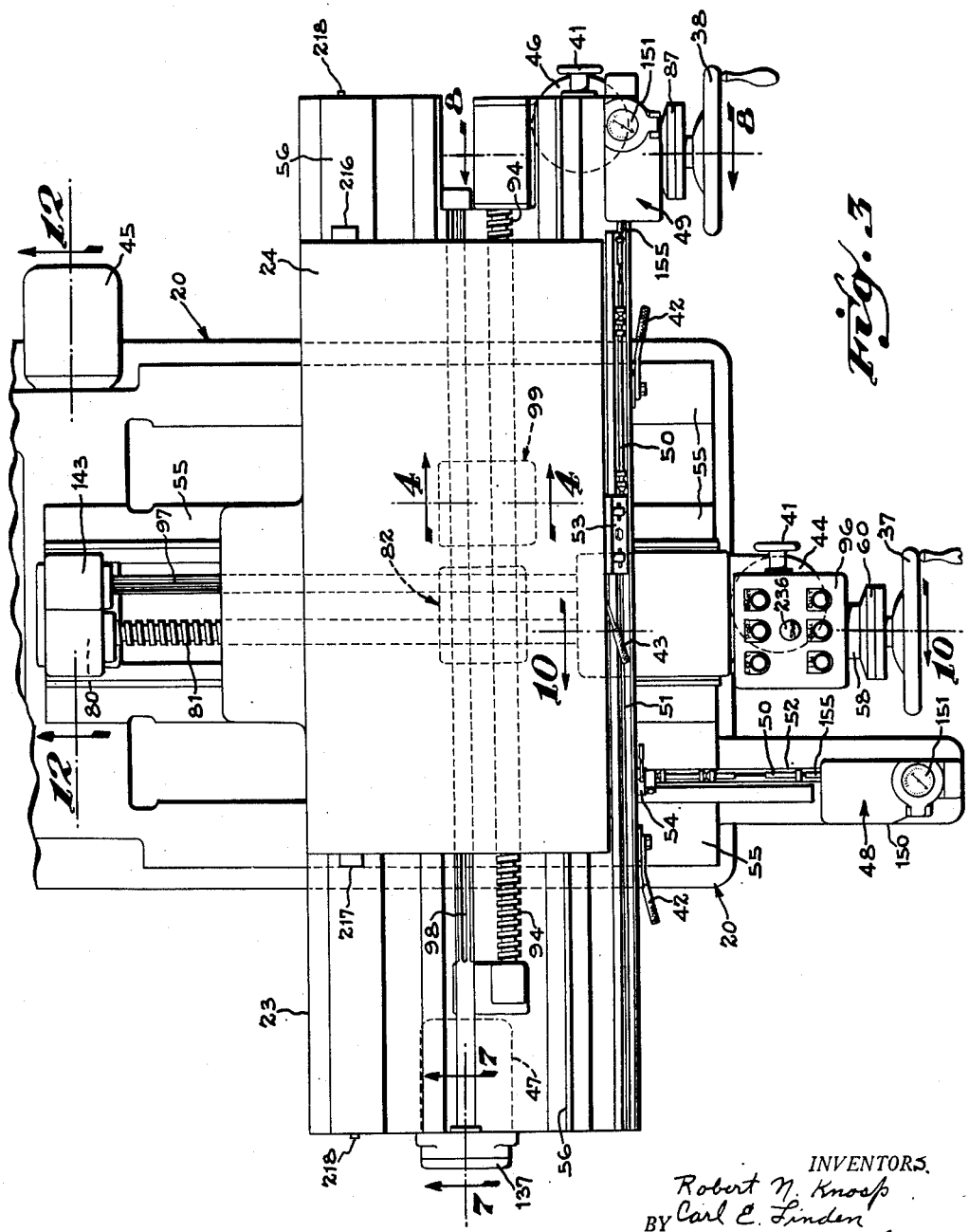

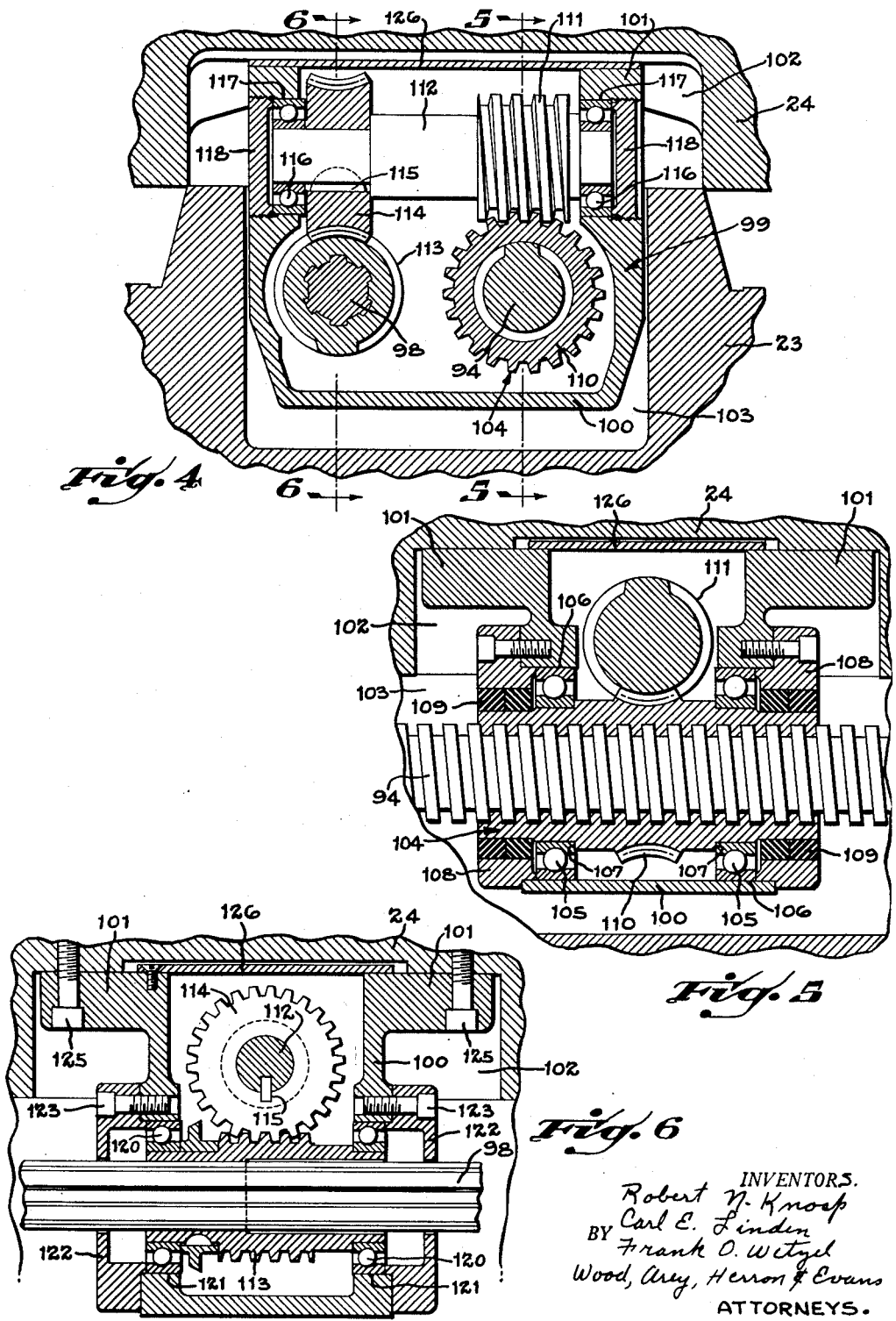

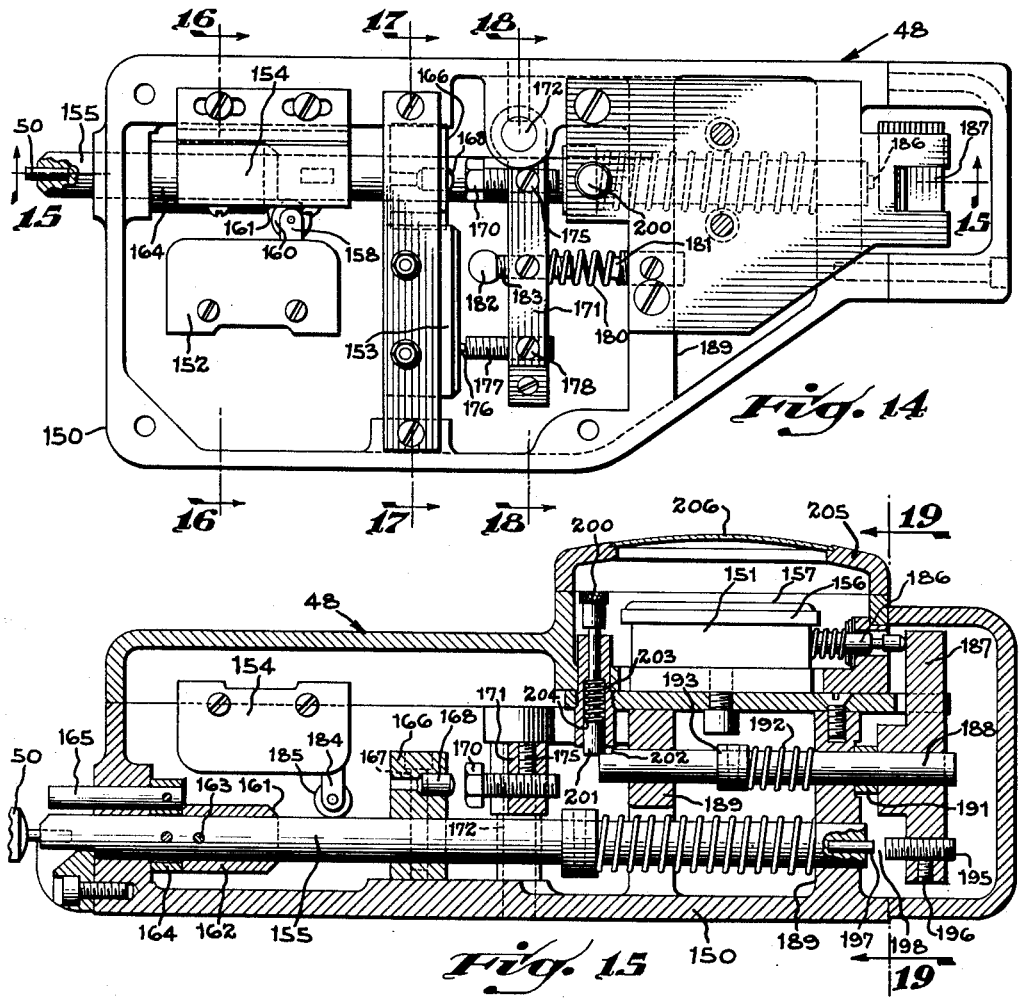
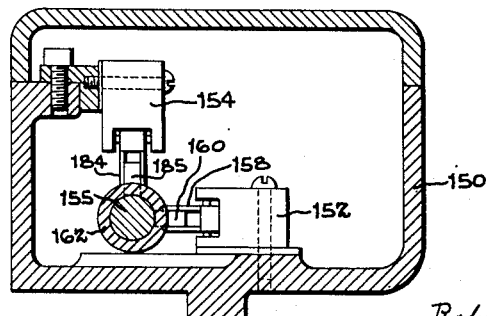

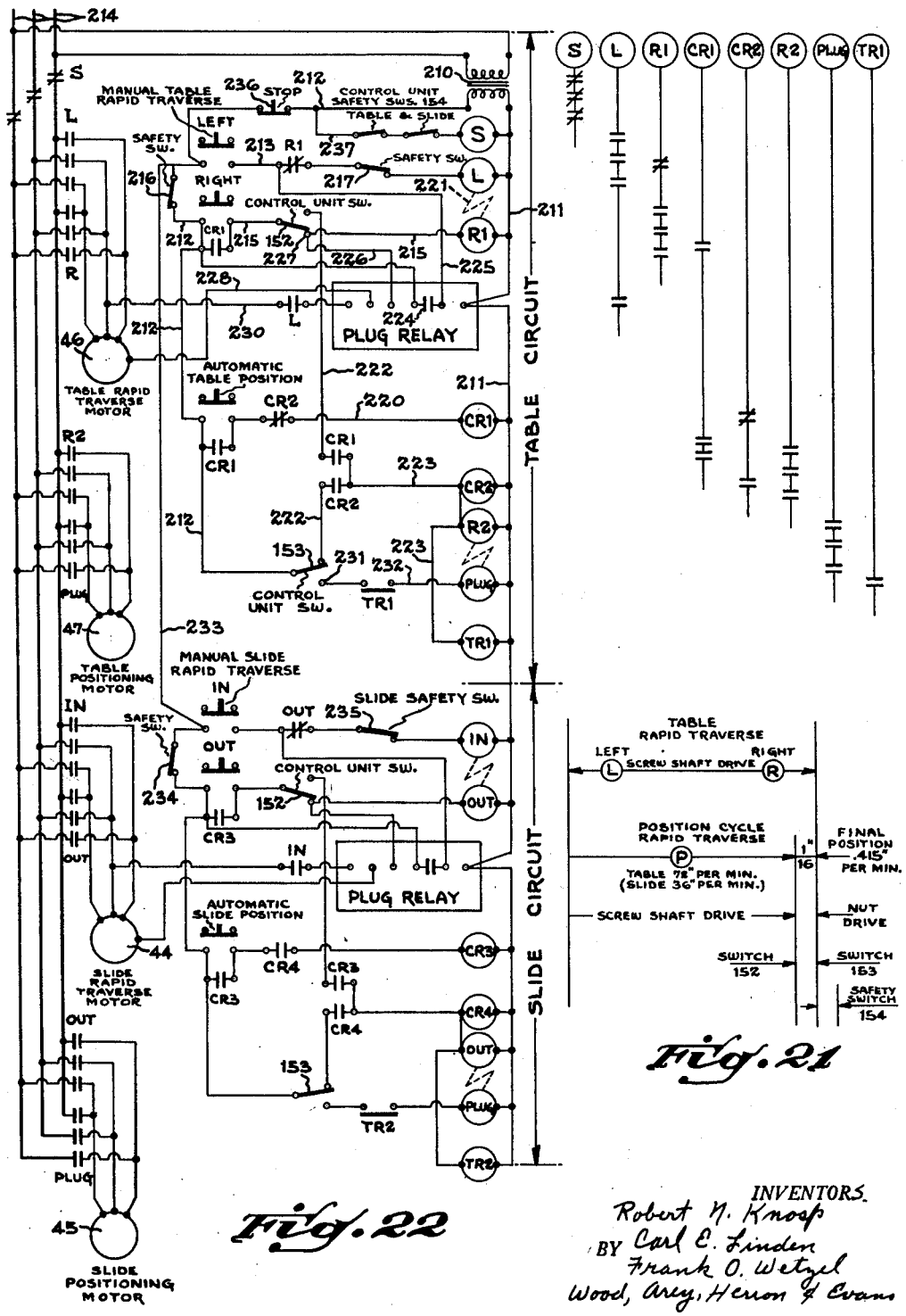

Patented Apr. 6, 1954

2,674,706

UNITED STATES PATENT OFFICE 2,674,706

AUTOMATIC TRAVERSE AND POSITIONING APPARATUS FOR MACHINE TOOLS

Robert N. Knosp, Ludlow, Ky., and Carl E. Linden, Cincinnati, and Frank O. Wetzel, Norwood, Ohio, assignors to The Fosdick Machine Tool Company, Cincinnati, Ohio, a corporation of Ohio Application June 10, 1950, Serial No. 167,346

17 Claims. (Cl. 318—8)

This invention relates to an automatic apparatus for positioning the sliding part or parts of a machine tool with respect to a stationary bed or like member; as a preferred example, the apparatus is of particular utility in controlling the movements of the cross slide and work mounting table of a jig boring machine in locating the work relative to the machine spindle. Boring machines of this class are used extensively in locating the holes of jigs and other work which requires precise centering and machining of holes and the invention is disclosed in its application to such a machine. It is contemplated, however, to utilize the apparatus in machine tools generally in shifting one member relative to another accurately to predetermined positions.

The usual jig boring machine is provided with a stationary bed having a fixed vertical column which carries the rotating tool spindle for vertical translation with respect to the work. Upon the bed there is mounted a horizontal, transversely movable slide and upon the slide there is mounted a table which is shiftable longitudinally with respect to the slide. The work is clamped upon the table and, by the combined positioning of the slide and table, various hole centers in both directions can be located accurately with respect to the axis of the spindle.

In operating these machines, the positions of the slide and table usually are controlled by measuring rods of predetermined length which are placed in troughs extending parallel with the slideways upon which the slide and table are mounted, thus, the respective measuring rods for the slide and table gauge the linear distance between hole centers in both directions. The rods may be placed in abutment in such wise that they provide a positive stop at the final position; however, in order to provide greater accuracy, dial indicators may be fixed relative to the slide and table in position to be actuated by the rods. One practice has been to feed the slide and table by means of hand wheels toward the dials, each dial being arranged to indicate when a predetermined amount of pressure is imposed upon the rod by a slight deflection of its pointer. If the rod is placed between two fixed abutments, the precision of the rod is effected by the amount of endwise pressure imposed against it; consequently, making it dependent upon the skill of the operator to apply exactly the proper pressure in order to position the sliding parts accurately. By placing a sensitive dial indicator against the end of each rod, it is possible for the operator to observe by deflection of the dial pointer the true position of the slide and table with respect to the spindle. A dial indicating arrangement of this kind is disclosed in the co-pending application of Robert N. Knosp et al., Serial No. 767,120, filed August 7, 1947, now Patent Number 2,592,433 to which attention is invited.

As distinguished from manual operation of the slide and table, as disclosed in the co-pending application, a primary object of the present invention has been to provide an apparatus which positions the slide and table in substantially the same manner but by automatic power feeding by operation of rapid traverse and positioning motors which respond to push-button control for traverse and respond to measuring rod pressure for exact final positioning. The apparatus is capable automatically of positioning the slide and table rapidly with extreme precision, the push button control being used for reverse feed and for initiating the cycle, while the measuring rods control the motors after they are in automatic operation, stopping them consistently with the slide and table centered at the hole location. The measuring units operate in conjunction with electrical control units generally similar to the indicating devices of the co-pending application containing in addition to dial indicators, switches for controlling the traverse and positioning motors. By virtue of the speed of the positioning cycles, the machine is capable of operating on a production basis in machining of jigs and also it may be applied to the mass production of duplicate precision machined workpieces. In the latter case, duplicating bars for the various hole centers can be cut from bar stock in a convenient manner, and, once the machine is set up, the bars may be placed in the machine to duplicate the various operations rapidly.

Another object of the invention has been to increase the speed and precision of the positioning operation by traversing the sliding members rapidly during their preliminary approach movement and inching them along at an extremely slow rate just prior to final positioning; thus, the time consumed in the major travel of the member is greatly reduced, while the highest degree of precision is attained by the slow advance before stopping at final position. To provide this action, the slide and table are each powered by two motors, one a rapid traverse motor and the other a final positioning motor, as above noted. The rapid traverse motor of each sliding member traverses rapidly to within a fraction of an inch of the final position and is then deenergized; simultaneously, the final positioning motor is energized to inch the member in the same direction, and upon reaching final position, it is deenergized. In one example, the sliding member is rapid traversed at the rate of 36 inches per minute, and upon approaching within $\frac{1}{16}''$ of the hole center, it is inched forwardly at the rate of .415 inch per minute to its final stopping position.

As applied to a boring machine, the automatic positioning apparatus for the slide and table are duplicates of one another and the term "sliding member" is used to designate either of them. The rapid traverse motor and final positioning motor of each sliding member cooperate with one another to provide the rapid traverse and final positioning movements. The motors are mounted upon the part of the machine which supports the sliding member, the cross slide motors being mounted upon the bed and the table motors being mounted upon the slide.

A further object has been to provide a simplified driving system for the paired rapid traverse and positioning motors which is common to both, which provides a two speed drive for the positioning and traverse motors respectively and which permits one motor to stop and the other to pick up the drive without the use of overrunning clutches or other coupling devices. For this operation, there is mounted on each sliding member a unit which converts motor rotation to precision linear advancement of the sliding member at a fast rate during operation of the rapid traverse motor and at a reduced rate during operation of the positioning motor. This unit includes a nut which is stationary during rapid traverse and which rotates during operation of the positioning motor. Both motors operate through a common drive system which consists of a screw shaft rotated by the rapid traverse motor, being threaded through the nut, and a splined shaft slidably connected to the nut to rotate it upon rotation of the positioning motor. When the screw shaft is rotated, the sliding member is traversed by the stationary nut at a relatively fast rate, as determined by the lead of the screw and the speed ratio between the motor and lead screw. When the sliding member is under the control of the final positioning motor, the screw shaft is stationary and the nut which is threaded upon it is driven at a greatly reduced speed to advance the nut along the screw shaft, carrying with it the sliding member at final positioning speed. The drive from the splined shaft to the nut is by way of a worm and worm wheel system slidably coupled to the splined rod, and the nut and its reduction system is confined within a housing mounted upon the underside of the sliding member. In order to maintain precision in controlling the sequential operation of the motors in response to movement and pressure imposed upon the measuring rod, the motor control system provides electric braking of the motors at their stopping points as determined by the setting of the control units and the components of the electrical control system.

The paired motors of the slide and table operate independently of one another and the positioning cycle can be executed simultaneously upon the slide and table by applying the duplicating rods to both units and initiating the automatic positioning cycle for both simultaneously. When the sliding member reaches its indexed position with the positioning motor deenergized, it is clamped firmly to its support prior to the boring operation. Since the slide and table move relative to one another, it has been found in practice that the operation of the positioning apparatus of one member develops certain vibrations which have a tendency to jolt the other member slightly from its final position even though it may be clamped. In a precision machine operating within extremely close tolerance, even a very minute deflection must be eliminated. It has been determined that if the screw shaft of the positioned member is relieved of stresses developed during the final positioning, then the tendency toward displacement is eliminated entirely since the shock apparently is transmitted to the member through its screw shaft. For this purpose, upon stopping of the final positioning motor, its armature is rotated in a reverse direction sufficiently to unstress the screw shaft by interposing backlash between the screw threads of the nut and screw shaft. In the present structure, it has been found that nine reverse revolutions of the splined shaft is sufficient to take up approximately one-half the backlash in screw threads and in the worm and worm wheel system which drives the nut. This arrangement has the additional advantage of providing accurate positioning without requiring working parts of extremely close workmanship. In practice, it has been found that the hole center can be aligned with the spindle axis consistently within a tolerance of plus or minus .0001'', which is well within the limits of most work.

The control units which are responsive to the pressure applied by the sliding member upon the measuring rods, each include a pair of electrical switches which are interconnected in the electrical control system to regulate sequentially the operation of the rapid traverse and positioning motors. The push button station provides direct manual control of the rapid traverse motors in either direction for use in moving the slide and table to a starting position for the placement of the measuring rods or duplicating bars and also places the system under automatic control. Separate sets of manual and automatic control buttons are provided for the slide and table. When the measuring rods are in place, either the slide or table or both may be placed under automatic control by depressing the automatic positioning buttons. Depressing the positioning button energizes the rapid traverse motor and, as the hole center is approached, the measuring rods actuate the first switch of the control unit; this switch being operable by way of the control system to shut down the rapid traverse motor and cut in the final positioning motor. The sliding member continues its advancement in the same direction but at the slow final positioning rate until the second switch of the control unit is tripped, at which point the positioning motor is reversed momentarily to stop the sliding member with stress relieved from its screw shaft, as described above. The sliding member then is in its final position and is clamped manually prior to machining operations.

The control units are in duplicate for the slide and tables respectively and an indicator dial is mounted within each unit with its actuating stem arranged to be operated upon movement of the measuring rods in substantially the same manner as in the co-pending application. The unit includes a slidable plunger which is engaged by the end of the measuring rod with its opposite end associated with the stem of the indicating dial in unloading direction such that the final travel of the sliding member is picked up by the indicator by movement of its pointer from a pre-set position to a zero reading; thus, indicating by the deviation of the pointer from zero, the degree of accuracy at final positioning. The plunger which actuates the indicator also is provided with a cam which, upon movement of the plunger by the measuring rod, actuates the rapid traverse switch to cut out the rapid traverse motor and cut in the positioning motor. The plunger further includes an abutment which operates through a motion increasing lever to trip the positioning switch and stop the positioning motor precisely at final position. These two operations occur in sequence and constitute the entire cycle of operation.

Various other features and advantages of the invention will be more fully apparent to those skilled in the art from the following detailed description taken in conjunction with the drawings.

In the drawings:

Figure 3 is a fragmentary top plan view showing the relationship of the slide and table upon the bed of the boring machine and illustrating generally the positioning apparatus and the driving system for the slide and table.

Figure 4 is an enlarged fragmentary sectional view taken on line 4—4, Figure 3, detailing the speed reducing worm box which cooperates with the screw shaft and splined shaft in traversing and final positioning the table by rotation of the screw shaft or nut.

Figure 5 is a sectional view taken on line 5—5, Figure 4, detailing the relationship of the rotatable nut and screw shaft of the speed reducing system.

Figure 6 is a sectional view taken on line 6—6, Figure 4, detailing the worm and worm wheel speed reducing drive from the splined shaft to the worm which rotates the nut worm wheel.

Figure 14 is a top plan view of the automatic positioning control unit which regulates the operation of the rapid traverse and positioning motors for the table, the unit being viewed as at Figure 3 with its cover removed.

Figure 15 is a longitudinal sectional view taken on line 15—15, Figure 14, illustrating the general arrangement of the switches and dial indicator of the control unit and the mechanism for actuating them.

Figure 16 is a cross sectional view taken on line 16—16, Figure 14, detailing the actuating mechanism for the rapid traverse and safety switches of the control unit.

Figure 21 is a motion diagram illustrating the movements executed by the cross slide and table during an automatic positioning cycle of operation and the movements under manual control.

Figure 22 is an electrical diagram illustrating the control system for the slide and table rapid traverse and positioning motors.

Figure 1:
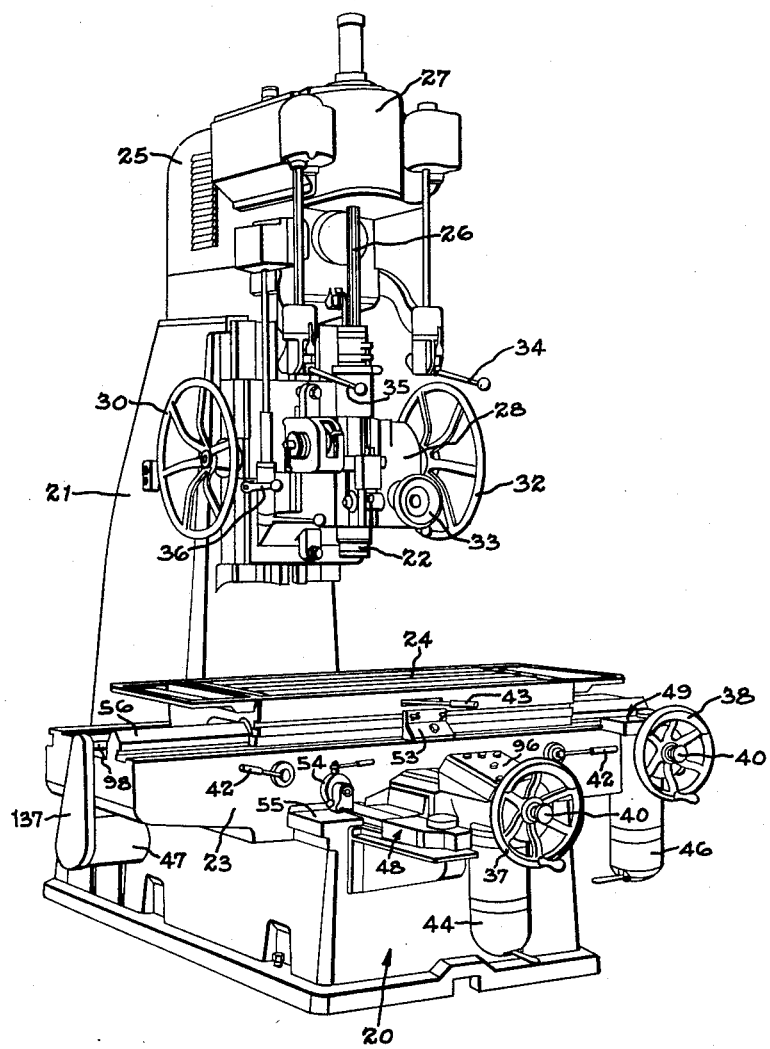
Figure 1 is a perspective view of a jig boring machine showing generally the drill head mechanism with respect to the slide and table and the general relationship of the slide and table automatic positioning apparatus.

The present invention resides particularly in the apparatus for positioning the slide and table with respect to the spindle; however, a general description of the various parts of the jig boring machine which cooperate with the positioning apparatus will bring out more clearly the structure and operation of the positioning apparatus. As disclosed in Figures 1 and 2, the machine includes a bed generally indicated at 20, having a column 21 rising vertically from its rearward side with a spindle 22 projecting downwardly toward the bed from the upper portion of the column. Upon the bed 20 there is provided a cross slide 23 which is slidably mounted for transverse movement, and upon the cross slide there is mounted a work table 24 which is slidable longitudinally with respect to the cross slide. The workpiece is clamped upon the table 24 and the hole centers are located by the combined longitudinal and transverse movements of the table and slide with respect to the spindle. The spindle includes the usual collet for mounting the various boring tools, drills, reamers and other special tools.

The spindle 22 is driven by a spindle motor 25 mounted upon the upper end of the column, the spindle being driven by a splined shaft 26 extending from a transmission 27 to the spindle which is journalled in a sliding head 28 mounted at the front of the column. The head 28 may be adjusted vertically by means of the hand wheel 30 and the spindle may be adjusted relative to the head by means of the hand wheel 32. In addition, there is provided a fine spindle feed wheel 33 for close control of the feed rate. The spindle may be fed at a selected power feed rate by the feed control lever 34, and a similar lever 35 is provided for selecting the spindle speed. The sliding head is provided with a clamp which is actuated by lever 36 which permits the head to be clamped rigidly in adjusted position.

Slide and table arrangement

The cross slide 23 and work table 24 may be adjusted manually with respect to the spindle by the hand wheels 37 and 38 which operate screw shafts respectively for the table and slide. These shafts also form a part of the automatic positioning apparatus; therefore, the description of the arrangement at this point applies both to the hand wheel and rapid traverse motor drive of the positioning apparatus. Hand wheel 37 for the cross slide includes a screw shaft which is journalled in the bed and threaded to the cross slide, and hand wheel 38 for table adjustment includes similar screw shaft geared to the hand wheel, extending parallel with the cross slide. This screw shaft is journalled in the slide and is threaded to the table for adjusting the table longitudinally with respect to the cross slide. To aid in locating centers manually, the hand wheels 37 and 38 include upon their hub, indicator dials which are calibrated to provide a reading corresponding to the movement of the slide and table relative to a fixed reference point.

To provide a fine adjustment, the respective hand wheels include reduction gearing, hereinafter described, by means of which the rotation of a fine feed wheel produces reduced movement of the slide and table. The gear trains are shifted into and out of mesh by means of a shifter knob 40 associated with each wheel and the gearing is such that the table and slide movements rotate the dials either with the hand wheels coupled or upon fine feed wheel rotation with the fine adjustment gearing in mesh. In fine adjustment the screw shafts are rotated by fine feed hand wheels 41 driving through the reduction gearing, as later described.

The table and cross slide are clamped in adjusted position prior to boring by suitable clamping apparatus which is actuated by the hand levers 42 and 43 for the cross slide and table respectively.

For production operations under automatic control, the mechanism is provided with motor driven positioning apparatus by means of which the cross slide and table are positioned automatically with extreme precision. The rapid traverse motors of the positioning apparatus drive the same screw shafts operated by the hand wheels, as noted above; and since the drives are interrelated, the essential parts of the positioning apparatus are indicated at this point. In general, this apparatus is duplicated for the cross slide and table respectively, there being provided in connection with the cross slide a rapid traverse motor 44 and a final slide positioning motor 45 (Figure 3) and similarly, a table rapid traverse motor 46 cooperating with a final table positioning motor 47. The operation of these paired motors in each instance is regulated by an automatic control unit having switches in electrical connection with a circuit which regulates operation of the rapid traverse and positioning motors. The switches are responsive to pressure imposed by the measuring rods, as hereinafter described in detail.

Since the cross slide and table move independently of one another by operation of respective pairs of rapid traverse and positioning motors, each pair of motors is controlled by an individual control unit having cooperating measuring rods which actuate the switches upon movement of the table or slide, as the case may be. As shown in Figure 3, movements of the cross slide 23 are regulated by the unit 48 and movements of the table are regulated by the unit 49. The sets of measuring rods for the respective control units are indicated in both instances at 50, the measuring rods for the table being supported in a V-shaped channel 51 formed in the upper surface of the cross slide while the rods for the cross slide are confined in a channel 52 formed in the bed of the machine. The measuring rods are actuated by adjustable dogs which are attached respectively to the table as at 53 and to the cross slide as at 54, the system being so arranged that, upon abutment of the measuring rods by the dogs, the switches in the control units are actuated to control sequentially the operation of the rapid traverse and final positioning motors. It has been found in practice that hole centers can be located rapidly and consistently under automatic operation within a tolerance of ±.0001" which is sufficient for most jig work and more than sufficient for precision production of workpieces. Even closer tolerances can be maintained if necessary by careful adjustment of the operating parts of the control apparatus. In addition to the control switches, the control units 48 and 49 also include indicating dials as in the co-pending application, which may be utilized by the operator in positioning the slide and table manually; in addition, the dials designate accuracy when the machine is under automatic control.

Slide handwheel and rapid traverse motor drive

Figure 2:
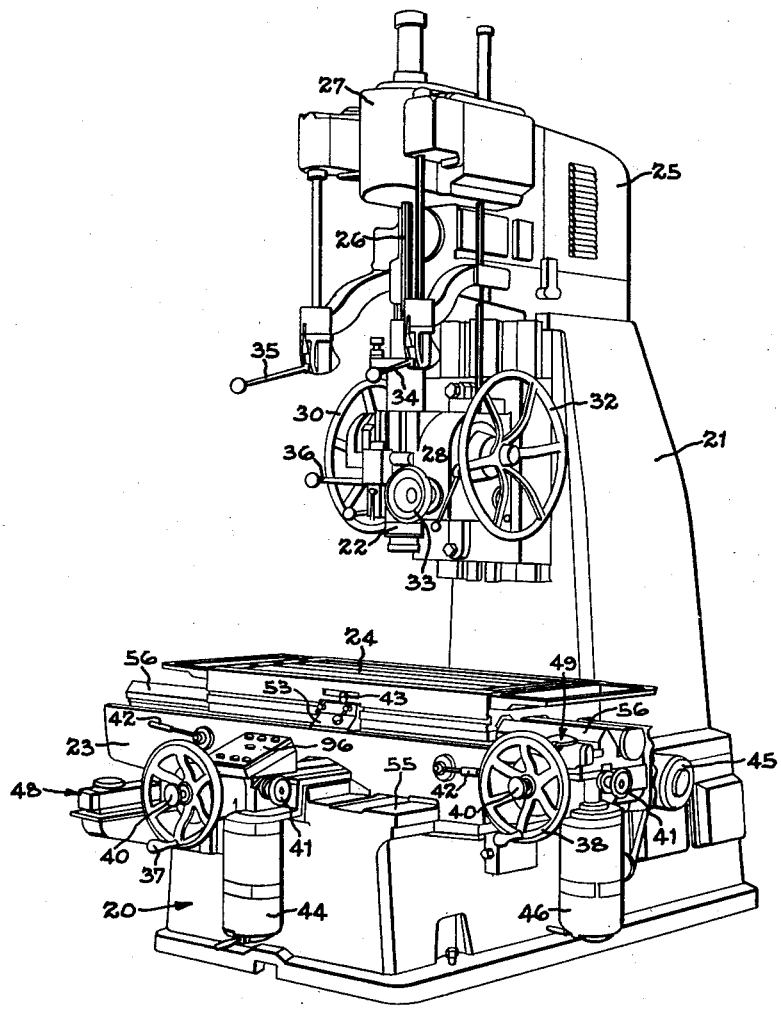
Figure 2 is a general perspective view similar to Figure 1, as viewed from the opposite side of the machine.
Figure 10:
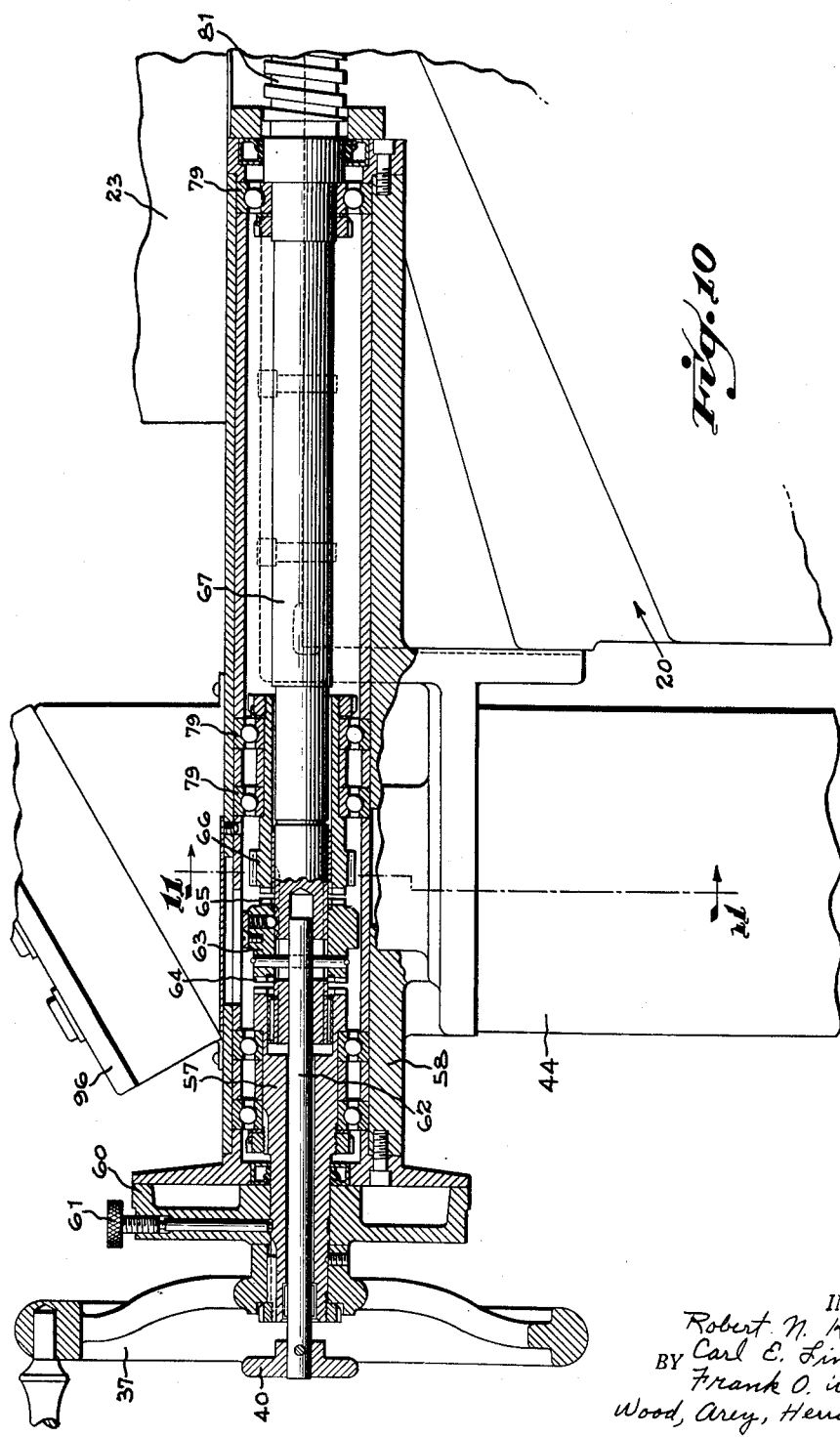
Figure 10 is a sectional view taken on line 10—10, Figure 3, illustrating the hand wheel and rapid traverse motor drive for the screw shaft of the cross slide.

As disclosed most clearly in Figures 1, 2 and 3, the bed 20 is provided upon its upper surface with a series of ways 55 which slidably support the cross slide 23 and the upper surface of the cross slide likewise is provided with ways 56 extending longitudinally for slidably supporting the work table 24. As shown in Figure 10, the cross slide hand wheel 37 is mounted upon the end of a sleeve 57 journalled in a bearing 58 mounted upon the bed. The feed dial 60 for indicating slide movements is mounted adjacent the hand wheel and may be adjusted with respect to the hand wheel by loosening the screw 61. This hand wheel dial is graduated in one-thousandths of an inch, as previously noted, and the ratio may be selected by operation of the shifter knob 40 which is connected by means of a shaft 62 to a shiftable clutch 63. In the position shown, the clutch 63 is in a neutral position in which it is disengaged from sleeve 57 so that the slide can be traversed by motor 44 without rotation of the handwheel. When the clutch is shifted to the left, a direct coupling is established by way of clutch teeth 64 with sleeve 57; when it is shifted to the right, a coupling engagement is established between the teeth 65 and worm wheel 66 which drives the slide screw 67, as disclosed more clearly in Figure 11.

As shown, the armature shaft 68 of motor 44 is provided with a worm 70 meshing with worm wheel 66 such that rotation of wheel 66 either by way of hand wheel 41 or by motor 44 causes rotation of the screw shaft 67. The motor reduction worm system in this manner serves also for fine hand wheel feed. The fine feed adjustment hand wheel 41 is mounted upon a shaft 72 upon the inner end of which there is pinned a bevel gear 73 meshing with a bevel gear 74 keyed to the armature shaft 68. Rotation of this wheel, by virtue of the speed reduction between the motor worm and wheel, permits the cross slide to be adjusted to a very fine point manually.

The screw shaft 67 extends crosswise of the bed for the full travel of the slide and it is journalled in ball bearings 79, as shown in Figure 10. The opposite end of the shaft is journalled in a bearing 80 secured upon the bed (Figure 3). The threaded portion 81 of the shaft passes through a worm housing indicated generally at 82 (Figure 3) which contains a nut threaded on the screw shaft, the housing being mounted upon the undersurface of the slide such that rotation of screw 81 traverses the nut, shifting the slide transversely with respect to the bed. The structural details of housing 82 are identical to the housing for the table which is detailed in Figures 4, 5 and 6, as described in detail hereinafter. At this point, it wil be observed that the cross slide may be fed manually by hand wheel 37 or fine feed wheel 41 and, in addition, it may be traversed under power upon operation of rapid traverse motor 44. Motor 44 in conjunction with the final positioning motor 45 (Figure 3) provides automatic operation of the machine, the hand wheel adjustments being utilized chiefly in operating the machine manually. It is contemplated in certain instances to eliminate the hand wheels and utilize the rapid traverse motor for all traverse operations.

*Table handwheel and rapid traverse motor drive*

The drive for the table by way of rapid traverse motor 46 and hand wheel 38 is similar to the cross slide drive except that the axis of the handwheel is at right angles (Figure 3) to the screw shaft, consequently requiring the use of angularly related gears between the two shafts. The structural details of this arrangement are disclosed most clearly in Figures 8 and 9. As shown, hand wheel 38 is mounted upon a sleeve of the same construction previously described, in this case, however the sleeve being journalled in a bearing bracket 86 which is carried by the cross slide. The arrangement includes a hand wheel indicating dial 87, and a shiftable clutch 88 controlled by a selector knob 40 similar to the structure disclosed in Figure 10. The table rapid traverse motor 46 drives a worm gear 91 similar to the gear 66, previously described, but in this case, the screw shaft is disposed at right angles to sleeve 86 and is driven by a spiral gear 92 meshing with a spiral gear 93 keyed upon the end of the table screw shaft 94. As shown in Figure 9, the fine feed hand wheel 41 drives through bevel gears to the motor armature shaft in the same manner as in the previously described slide adjustment wheel. It will be noted that in both cases the fine feed wheel rotates with the motor armature and takes advantage of the motor speed reducing worm and wheel.

*Automatic positioning apparatus*

As outlined above, the rapid traverse motors for the slide and table operate in conjunction with the final positioning motors to provide automatic operation of the machine, the hand wheel adjustments being utilized chiefly in operating the machine manually. In setting up the machine for automatic operation as in a production boring operation for duplicating workpieces or jigs, the several hole centers are located manually in the customary fashion, for example from a reference point or line such as an edge of the workpiece in accordance with the dimensions required. In this operation, gauges and center finders and other fixtures may be employed to determine the various dimensions, both longitudinally and transversely. The cross slide is adjusted transversely in determining the dimensions between the holes transversely of the workpiece and the table in a similar manner is adjusted longitudinally upon the cross slide to determine the dimensions longitudinally of the workpiece.

Upon determination of the dimension between a hole and another hole or reference line in a given direction, a set of measuring rods 50 (Figure 3) is placed in the trough for that particular slide together with an inside micrometer which is adjustable to compensate for decimals included in the dimension. Alternately, a set of duplicating bars or rods can be cut from bar stock to lengths corresponding to the several dimensions of the job. The measuring rods are finished in lengths of one inch and multiples of an inch and the inside micrometer in a convenient manner may be set to the decimal place required by the dimension. In a workpiece having a plurality of holes to be bored, a set of duplicating rods corresponding to the center-to-center distance of each hole is in this manner determined and when the machine is finally set up for boring, each hole can be relocated simply by placing in the trough the set of measuring rods and micrometer for the indicated dimension or a designated duplicating rod serving the same purpose.

A switch box 96 is mounted at the front of the bed having control buttons respectively for the cross slide and table which permit the operator in a convenient manner to back the slide and table in a direction opposite to the final positioning direction or to place the apparatus under automatic control. As above outlined, the table and slide each is provided with a dog engageable against the end of the duplicating rod or the assembled measuring rods to bring to a stop the table and slide when a predetermined pressure engagement is established between the dogs and measuring rods. The opposite ends of the rods are in abutment with the plunger of the respective control units 48 and 49 whereby the final positioning motors are deenergized at the precise centering position of the workpiece with respect to the boring spindle.

In order to provide holes of precise concentricity they are bored in most instances with a boring tool rather than a drill, the boring tool being provided with a cutter mounted off-center with respect to the spindle so as to develop the circumference of the hole. For most purposes, an adjustable boring tool is provided whereby the hole diameter may be established accurately, and in a production operation, a set of boring tools usually is provided for the various hole diameters. By changing the duplicating rods and mounting the appropriate boring tool in the spindle, the workpieces or jigs can be duplicated at a rapid rate simply by placing the slide and table under automatic operation to cause the positioning motors to align the workpiece precisely in accordance with the predetermined centers.

As above indicated, automatic positioning of the cross slide and table is accomplished by the rapid traverse motors 44 and 46 operating in conjunction with the final positioning motors 45 and 47. Rapid traverse occurs when the rapid traverse motors rotate their screw shafts 81 and 94 and, in the present structure, the cross slide is traversed by its screw shaft at the rate of 36 inches per minute and because of its greater travel, the table is traversed longitudinally of the cross slide at the rate of 72 inches per minute. As the slide and table approach their final position, the rapid traverse motors are deenergized, bringing the screw shafts to a stop and final positioning is accomplished by the above noted motors 45 and 47 for the cross slide and table respectively.

In order to locate the hole centers with maximum precision, the feed rate during final positioning is greatly reduced, the slide and table both being advanced at the rate of .415 inch per minute. In operation, the rapid traverse motor for the slide and table are interrelated with the final positioning motors to cause the rapid traverse motor in each instance to stop at a predetermined limit during traverse, at which point the final positioning motor is energized to complete the positioning operation and to stop automatically when the hole center is precisely aligned with the center of the spindle.

For this purpose, the cross slide and table are provided with a respective splined shaft which are indicated at 97 and 98 respectively for the cross slide and table (Figure 3). These shafts extend parallel with the screw shaft of each member and are driven by the positioning motors 45 and 47 upon deenergization of the rapid traverse motors. In order to provide a very fine feed, there is provided a gear reducing mechanism between the final positioning shafts and the rotary nut which is driven by them. As previously noted, the screw shafts are in threaded engagement with a normally stationary nut enclosed in the worm boxes 82 and 99 for the slide and table respectively. The function of the worm boxes is a dual one; first, to convert the rotation of the screw shaft into rapid linear movement of the slide and table and, secondly, to convert the rotary movement of the splined shafts into a reduced rate of movement to provide the final positioning rate, above noted, with the screw shaft stationary. This operation is accomplished without the use of clutches by rotating the screw relative to the stationary nut during rapid traverse, and by rotating the nut at a slow rate relative to the stationary screw shaft during positioning.

Table positioning drive

The worm boxes 82 and 99 are in duplicate respectively for the cross slide and table and the detailed description in connection with Figures 4 to 6 inclusive applies to both. As shown in Figure 4, the worm box indicated generally at 99 is connected to the lower surface of the work table 24 and consists of a housing 100 having flanges 101 seated within a recess 102 formed in the table. The upper surface of the slideway which supports the table includes a longitudinal channel 103 for clearance of the worm box. The screw shaft 94 for rapid traverse of the table is connected to the motor 46 by the reduction gearing, previously described.

Within the worm box housing 99 there is journalled a rotatable nut 104 mounted upon ball bearings 105 having their outer races seated in bores 106 formed in the housing. These bearings are seated against respective shoulders 107—107 formed on the opposite ends of the nut and the bearings are secured against endwise displacement by the bearing caps 108. The bearings are protected from dust and dirt by the sealing rings 109. The center of the nut includes a worm wheel 110 which is engaged by the worm 111 which is formed upon the shaft 112 (Figure 4). The worm 111 is driven by the normally stationary splined shaft, as hereinafter described, the driving connection between the splined shaft and worm being non-reversible so that the nut is locked against rotation during rapid traverse with the screw shaft rotating and the splined shaft stationary. Upon rotation of screw shaft 94, the stationary nut 104 will traverse the screw shaft carrying with it the table at the rate of 72 inches per minute, by virtue of the lead of the thread in conjunction with the speed of rotation provided by the reduction gearing of the motor. When the screw shaft is stopped, the splined shaft begins to rotate at a predetermined speed and in an automatic manner, as hereinafter described, to feed the table at the rate of .415 inch per minute with respect to the stationary screw shaft.

In order to obtain the desired fine feed, the nut 104 is driven at a reduced rate from the splined shaft 98 through a worm 113 (Figure 6) which is slidably keyed to the splined shaft and in mesh with a worm wheel 114 keyed as at 115 to shaft 112. The opposite ends of shaft 112 are journalled in the ball bearings 116—116 which are fitted in the bores 117 formed in the housing 100. The bearings are locked against endwise displacement by the caps 118—118 which engage the outer races of the bearings. The worm 113 which drives worm wheel 114 is journalled at opposite ends in ball bearings 120—120, also fitted in bores 121 formed in the lower portion of housing 100. These bearings are locked in position by the caps 122 secured by screws 123 to the end walls of housing 100 and the splined shaft 98 is slidably engaged with respect to the worm to permit table movement longitudinally with respect to the shaft.

Rotation of the splined shaft drives worm 113, worm wheel 114, and worm 111, causing rotation of nut 104 through worm wheel 110. Rotation of the nut with respect to the stationary screw shaft 94 thus moves the table relative to the slide, the thrust of nut 104 being transmitted through the bearings 105—105 to housing 100. The housing is secured by means of its flanges 101—101 to the undersurface of the table, the flanges being secured by the screws 125 threaded into the table. A cover plate 126 is secured upon the upper surface of the flanges to confine the lubricant of housing 100 and to prevent the entry of dust and dirt.

The structure disclosed in Figures 4, 5 and 6 is in duplicate for the cross slide, as above indicated, in the structure illustrated, the worm box being secured to the table with the screw shaft and splined shafts journalled in the cross slide. In the slide structure, the worm box is secured to the bottom of the slide with the screw shaft and its companion splined shaft, journalled in bearings mounted upon the bed. During automatic operation, the table and slide may be moved either simultaneously or they may be moved individually in accordance with the push buttons depressed by the operator in manipulating the machine. The control system and its operation is disclosed in detail in conjunction with the control circuit illustrated in Figure 22 with reference to the control unts 48 and 49 for the cross slide and to the table respectively.

Figure 7:
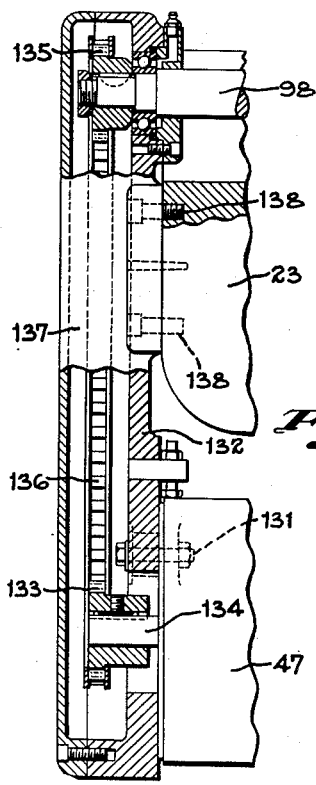
Figure 7 is a sectional view taken on line 7—7, Figure 3, detailing the positioning motor drive of the splined shaft for the table.

The positioning motor 47 for driving the splined shaft 98 of the table is located to the left of the cross slide as viewed in Figure 3. This motor is mounted as shown in Figure 7 by screws 131 passing through the end wall 132 of the cross slide. A sprocket wheel 133 is keyed to the armature shaft 134 of the motor and a similar sprocket wheel 135 is keyed upon the end of the splined shaft 98, a sprocket chain 136 passes over the sprocket wheels 133 and 135 to transmit the motor drive to the splined shaft at a one to one ratio. The sprockets and sprocket chain are enclosed by a guard 137 which is bolted as at 138 to the end of the slide. Rotation of motor shaft 134 is transmitted to the splined shaft when the screw shaft is stationary to advance the table longitudinally to the position determined by the table switch box, as above noted.

*Slide positioning drive*

Figure 12:
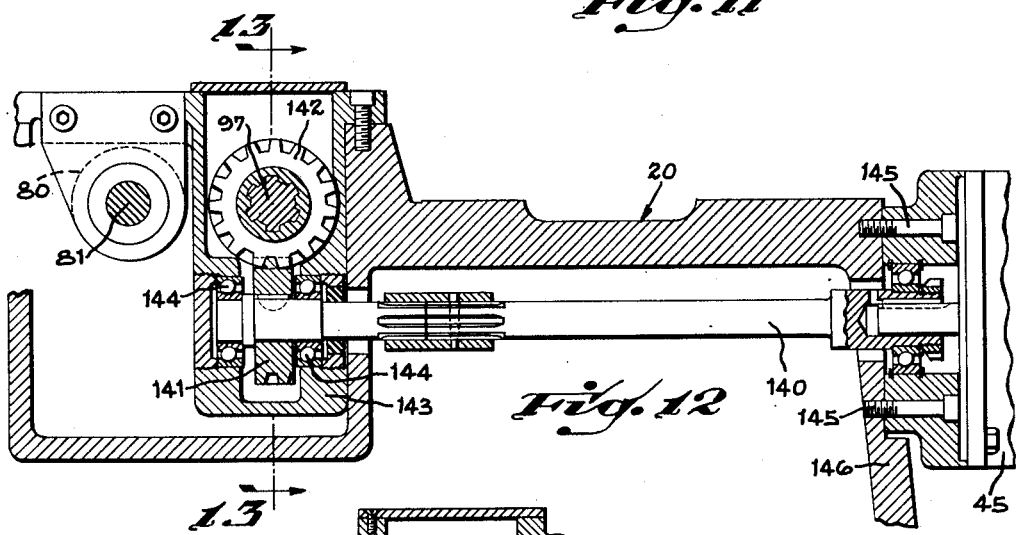
Figure 12 is a sectional view taken on line 12—12, Figure 3, detailing the slide positioning motor driving system.

The drive for splined shaft 97 which positions the slide relative to the bed is illustrated in Figure 3 and detailed in Figure 12. As shown, the slide positioning motor 45 is mounted upon the bed and its drive shaft 140 is provided with a spiral gear 141 meshing with a spiral gear 142 keyed to the end of shaft 97. Shaft 97 is related at right angles to the drive shaft 140 and the spiral gears are enclosed in a housing 143. Drive shaft 140 is journalled in ball bearings 144—144 fitted within bores formed in the housing 143 and the ratio between gears 141 and 142 is one to one. As shown, the motor is secured by screws 145 to the side flange 146 of the bed.

It is to be noted in Figure 3 that the housing 143 provides a bearing for the end of the cross slide screw shaft 81 which extends crosswise of the table with its intermediate portion engaged by the nut 104 of the slide worm box 82. It will be apparent, therefore, that rotation of the rapid traverse motor 44 with the splined shaft stationary will cause the cross slide to move transversely along the splined shaft and rotation of the splined shaft with the screw shaft stationary will cause the nut to rotate and will traverse the slide with respect to the stationary screw shaft in the same maner as the table.

Figure 8:
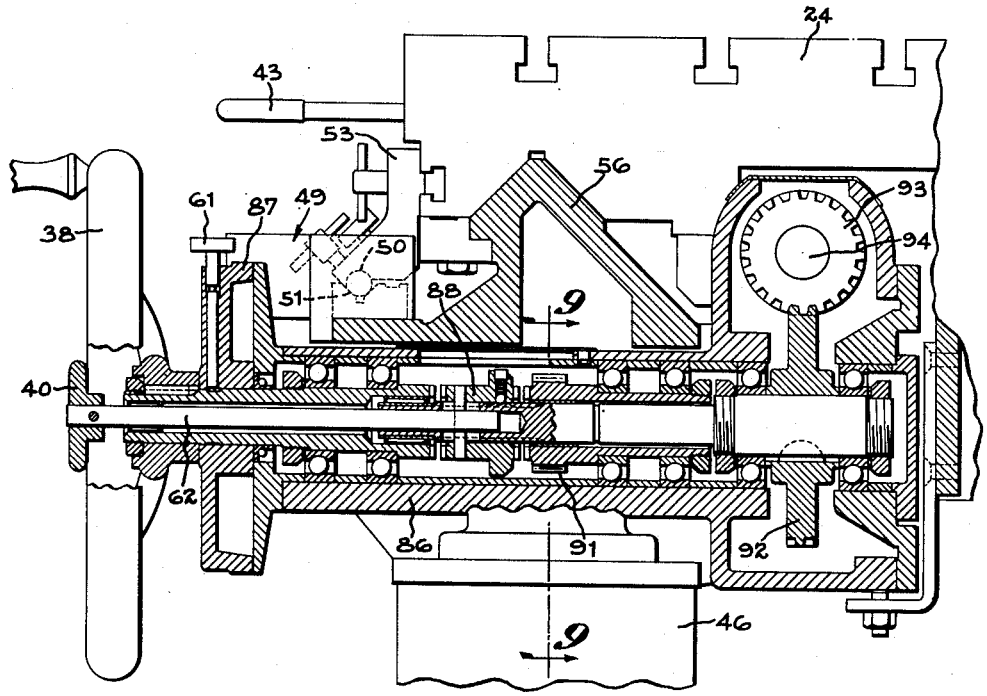
Figure 8 is a sectional view taken on line 8—8, Figure 3, detailing the hand wheel and rapid traverse motor drive for the table screw shaft.
Figure 9:
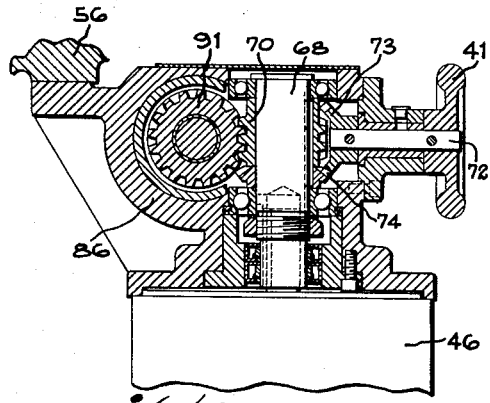
Figure 9 is a fragmentary sectional view taken on line 9—9, Figure 8, detailing the speed reduction drive between the table rapid traverse motor and screw shaft and the driving connection of the fine feed hand knob.
Figure 11:
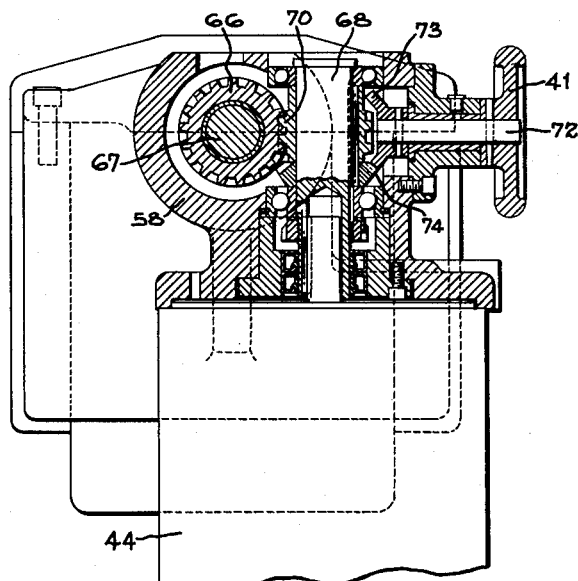
Figure 11 is a cross sectional view taken on line 11—11, Figure 10, detailing the speed reduction gearing between the rapid traverse motor and screw shaft for the cross slide and the driving connection for the fine feed hand knob.
Figure 13:
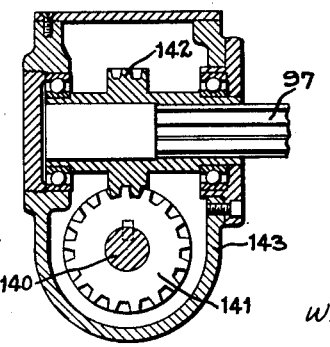
Figure 13 is a sectional view taken on line 13—13, Figure 12, detailing the right angular spiral gear drive connecting the slide positioning motor drive to the splined shaft.

In order to obtain the desired 72 inch per minute table travel, the gear train illustrated in Figures 8 and 9 between the rapid traverse motor 46 and screw shaft 94 provides a 6 to 1 speed reduction between the motor armature and screw shaft, motor 46 being in the present instance a standard A. C. motor with a speed rating of 1800 R. P. M. with an actual speed of approximately 1750 R. P. M.. To provide the 36 inch per minute slide rapid traverse, a 12 to 1 reduction is provided by the gear train between the motor shaft and screw shaft, as illustrated in Figures 11, 12 and 13. This motor likewise is rated at 1800 R. P. M. and, as above noted, the higher transverse rate of the table is necessary because of the increased range of travel over the transverse slide travel.

The .415 rate of movement of the table and slide during final positioning is of course designed to position accurately, since the overrun of the parts upon stopping of the positioning motors is very minute at this speed. In other words, the high reduction gear train of the worm boxes between the splined shaft and the nut is such that a few turns one way of the shaft or the other after the motor is deenergized, does not materially affect the accuracy of the positioning operation. The speed reduction provided by the worm boxes in the present example is 1 to 1024, there being a 32 to 1 reduction between worm 113 and worm wheel 114 and a second 32 to 1 reduction between worm 111 and nut 104. The positioning motors are rated at 1800 R. P. M. with an actual speed of 1750 R. P. M. and the worm and worm wheels are single lead in both instances with a lead of one-quarter inch per turn. At 1750 R. P. M. spline shaft rotation, the worm box speed reduction produces .415 inch per minute positioning speed. As hereinafter described in connection with the electrical circuit, a final positioning switch in the control unit causes the motor to deenergize promptly upon tripping of the switch by the measuring rods at final position. It will be apparent, therefore, that with a reasonably accurate electrical system, an extremely accurate operation is assured.

After the positioning motor has been brought to a stop at final position, it has been found in practice that a slight displacement of the table or slide is likely to occur if the sliding member is clamped with the screw shaft under stress against the nut due to the resistance of the sliding member during its positioning movement. If the member is clamped to its supporting surface under these conditions, shocks and vibrations apparently are transmitted through the screw shaft to the sliding member upon operation of the machine with a consequent loss of accuracy. This effect probably is due to the plugging of the motors on the sliding member which is last to be positioned. In operation by way of example, if the table is positioned first and clamped with the screw shaft under stress and the slide motors operated to position the slide, the shock caused by the plugging of the slide motors causes a minute displacement of the table.

To eliminate this problem, the plugging circuit for the positioning motors is provided with timers which reverse armature rotation of the positioning motors momentarily at the final limit of travel. The timer preferably is set to provide approximately nine reverse revolutions of the splined shaft which, by reason of the gear reduction between the shaft and nut has been found sufficient to take up approximately half the back lash existing in the gear reduction unit and between the threads of the nut and shaft. The reversal thus is insufficient to cause reverse movement of the table but is sufficient to relieve the stress on the screw shaft. The table thus is out of actual pressure engagement with the screw threads upon being clamped and it has been found that this arrangement eliminates any shifting due to vibration and shocks.

*Automatic control unit*

As above noted, the positioning system for the cross slide and table in each instance is provided with a positioning control unit which cooperates with the measuring rods or duplicating bars to control the respective pairs of rapid traverse and positioning motors. These respective units are substantial duplicates of one another and are detailed in Figures 14 to 19 inclusive. As disclosed in Figure 3, the control unit 48 for the slide is mounted upon a bracket extending from the forward edge of the bed and the unit 49 for the table is mounted upon a bracket secured upon the forward side of the slide at the right hand end. Each unit consists of a housing 150 enclosing a dial indicator 151, a rapid traverse control switch 152, a positioning control switch 153 and a safety switch 154. These respective switches preferably are of the micro-switch type being snap switches having a pole which is responsive to very slight movements to open and close the circuit. The function of the respective switches is disclosed more clearly hereinafter in connection with the circuit diagram illustrated in Figure 22.

The switches control the operation of the rapid traverse motors and positioning motors in response to movements of a spring loaded plunger 155 (Figures 14 and 15) which is slidably mounted within the housing 150 and interconnected with the several micro-switches and with the indicating dial 151 for actuating the switches and indicating upon the dial the true position of the sliding member. As above noted, the slide and table control units are duplicates of one another and the following detailed description applies to both. As shown in Figure 3, the plunger 155 of each control unit is disposed in alignment with one of the troughs 51 with its outer end in abutment with the measuring rods 50 so that movement of the sliding member is transmitted from the dog to the measuring rods and from the measuring rods to the plunger to operate the switches and dial indicators. The dial 151 preferably is calibrated in ten thousands of an inch graduations and its dial face 156 is capable of being adjusted with respect to its pointer 157.

In setting up the machine, the dial is usually adjusted to a zero position with respect to the pointer with the spindle accurately located upon its hole center and with the measuring rods engaged between the dog and plunger. It will be apparent, therefore, that upon subsequent operations, the dial will swing from zero position when the sliding member is moved away from the control unit in placing the measuring rods; when the member again moves toward the unit the dial indicator will swing back to its zero position to indicate the true position of the table relative to the hole center.

In precision boring operations, the pressure imposed upon the measuring rods can vary the setting of the machine due to springing of the parts under pressure. The indicating dial in combination with the spring loaded plunger, provides a predetermined and constant loading upon the rods. By operating the final positioning siwtch from the plunger causing it to respond to a predetermined amount of movement, the positioning motor can be deenergized with precision and without variation due to pressures exerted upon the measuring rods. The indicating dial also being connected to the plunger, indicates with precision by movement of its pointer from a position removed from the zero calibration toward the zero point. After the final positioning motor is deenergized, the pointer remains at or near the zero graduation to indicate minutely to the operator the degree of accuracy above or below the zero position.

Figure 17:
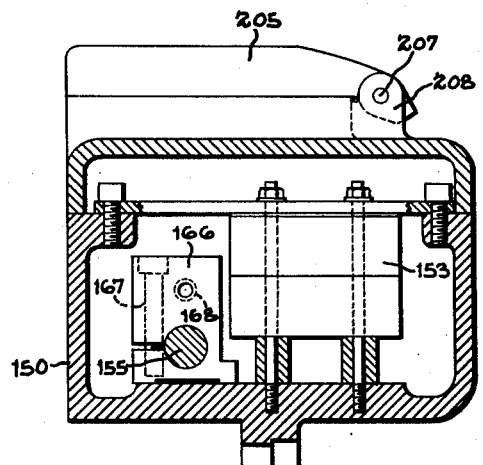
Figure 17 is a cross sectional view taken on line 17—17, Figure 14, illustrating the mounting arrangement for the final positioning switch.
Figure 18:
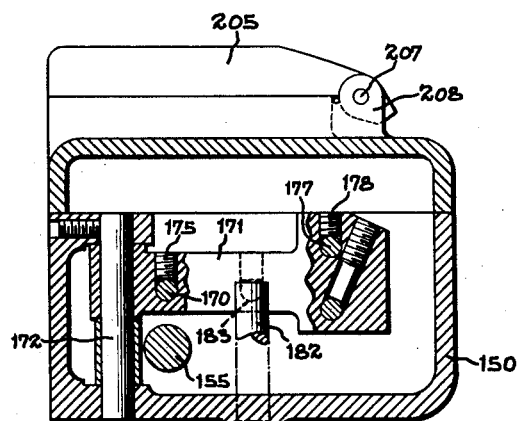
Figure 18 is a sectional view taken on line 18—18, Figure 14, detailing the motion increasing lever for tripping the final positioning switch.

Described in detail, the rapid traverse switch 152 includes a stem 158 having a roller 160 cammed against the tapered end 161 of an actuating sleeve 162 pinned as at 163 to the plunger 155 (Figures 14 and 15). Adjacent the sleeve 162 there is pinned a collar 164 which includes a pin 165 extending parallel with the plunger 155 through the end wall of the housing for manual testing or tripping. The roller 160 of the rapid traverse switch normally tracks upon the plunger 155 and is engaged by the tapered end 161 as the measuring rods begin to shift the plunger 155 during rapid traverse of the table. This depresses switch stem 158, plugging the rapid traverse motor to a stop, at which point the control circuit cuts in the final positioning motor. As the sliding member advances, plunger 155 continues its inward movement carrying with it an abutment block 166 which is clamped to the plunger by screw 167 (Figure 17). Block 166 includes a stud 168 which eventually engages a set screw 170 threaded through a motion increasing lever 171 which operates the positioning motor switch 153.

Lever 171 is arranged to multiply the movement of plunger 155 and thereby to provide increased sensitivity in the operation of the positioning switch. For this purpose, the end of the lever is pivoted upon a stub shaft 172 which is fixed in housing 150 with its free end extending across the housing into operating relationship with the positioning switch. The abutment screw 170 is located close to the pivot bearing 172 parallel with the plunger 155 and is locked in adjusted position by the set screw 175. The operating stem 176 of the positioning switch 153 is actuated by a threaded stud 177 passing through the swinging end of lever 171. Stud 177 is locked in adjusted position by a set screw 178.

Switch 153 conditions the control circuit to stop and reverse the positioning motor in order to position the table precisely at its pre-set position and to relieve the thrust on the screw shaft, as above outlined, with the table in final position. The switch trips at a predetermined point as stud 177 moves away from the stem 176. The switch operating lever 171 is normally maintained in the position shown in Figure 14 by a spring 180 maintained in compression against one side of the lever with its opposite end seated upon a stud 181 secured in the wall of the housing. The lever is backed up against a stop 182 consisting of a pin secured in the housing engaged by a stop screw 183 threaded through the lever. By virtue of the several adjustments thus provided, the lever can be set to trip the positioning switch at a given point during movement of the spring loaded plunger 155.

In addition to the rapid traverse and positioning switches, the control unit is further provided with the safety switch 154 which includes a stem 184 and roller 185 adapted to be tripped by the tapered end 161 of sleeve 162. The actuating roller of the switch is displaced inwardly from the roller of the rapid traverse switch sufficient distance to render the switch normally inoperative since the traverse and final positioning switches will be tripped before the roller is engaged by the taper of the sleeve. However, in the event that the control circuit should fail to deenergize either the rapid traverse or positioning motors by operation of the control unit, the safety switch will be tripped before any damage can be inflicted upon the control unit. The safety switch is interconnected in the control circuit in such a way that the power circuit is deenergized when it is tripped.

Figure 19:
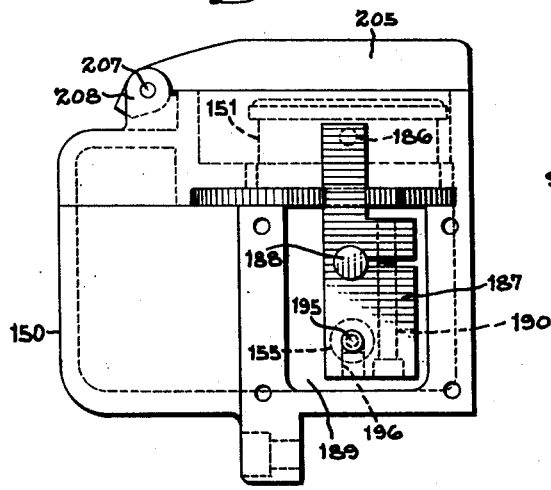
Figure 19 is a sectional view taken on line 19—19, Figure 15, illustrating the actuating mechanism for the dial indicator.

During the final movement of plunger 155 toward final position, it is arranged to actuate the pointer of the dial indicator and pick up several thousandths of an inch in traveling from pre-set to zero to indicate the final position. The parts can be adjusted to vary the dial pick up; in practice, a setting of five thousandths from zero is often selected because this provides a pointer movement of one-half turn. The indicator is operated in the unloading direction similar to the arrangement shown in the co-pending application in order to prevent shocks being transmitted to it through the measuring rods. For this purpose, the actuating stem 186 of the dial is engaged against an abutment finger 187 which is carried upon a slide shaft 188 slidably journaled within walls 189—189 formed in housing 150. The finger 187 is clamped upon rod 188 by means of a clamp screw 190, as shown in Figure 19. A spacer collar 191 is interposed between the abutment finger and wall 189 to provide a positive stop for the finger when the plunger 155 is out of engagement with it. The plunger and its rod are spring-urged toward the indicator dial by a spring 192 disposed in compression between wall 189 and collar 193 pinned to the rod 188. The abutment finger normally holds the indicator pointer away from its zero position by depressing the stem 186 such that movement of the abutment finger to the right, as viewed in Figure 15, will cause the dial to swing toward its zero position.

The abutment finger includes at its lower end an adjustable stop screw 195 which is locked in adjusted position by a set screw 196. This stop screw is engaged by a pin 197 extending from the end of plunger 155 with a predetermined amount of clearance indicated at 198 normally existing between the stop screw and pin. This clearance can be adjusted to provide the desired indicator movement to pick up on the indicator approximately five thousandths of an inch corresponding to one-half turn of the pointer, as above noted. Thus, pin 197 will contact stop screw 195 just before the final positioning switch is tripped at the end of the cycle.

The dial indicator is further provided with a latch similar to that disclosed in the co-pending application operable to lock the finger 187 out of engagement with the actuating stem. This lock constitutes a plunger 200 slidably mounted in the housing adjacent the indicator with its lower end 201 resting upon a flat 202 milled in the end of the rod 188. The latch plunger is spring urged in latching position by a compression spring 203 engaged against a shoulder 204 in the upper end of the member 201. If for any reason plunger 155 is depressed beyond the normal travel of the indicator stem, plunger 201 prevents the finger 187 from reengaging the indicator under spring pressure which might damage the indicator. The indicator is reloaded by lifting plunger 201. The dial indicator is enclosed by the cover 205 which is provided with a transparent window 206 for viewing the indicator, and the cover is hingedly mounted upon a pin 207 passing through lugs 207 formed in the upper portion of the housing, as shown in Figure 17.

Electrical system

The control circuit disclosed in Figure 22 regulates the operation of the rapid traverse and positioning motors for the slide and table in response to the control unit switches for the final positioning of the table and slide and also in response to manual operation of push buttons. The electrical system disclosed embodies duplicate circuits for the table control and cross slide control, a separate push button station and control unit being provided for regulating both the slide and table. The respective control units and switch boxes for the slide and table are interconnected in duplicate control circuits for slide and table; and as indicated in the diagram, the upper portion constitutes the table control circuit and the lower portion, the slide control circuit, both circuits being arranged to operate independently of one another.

Figure 20:
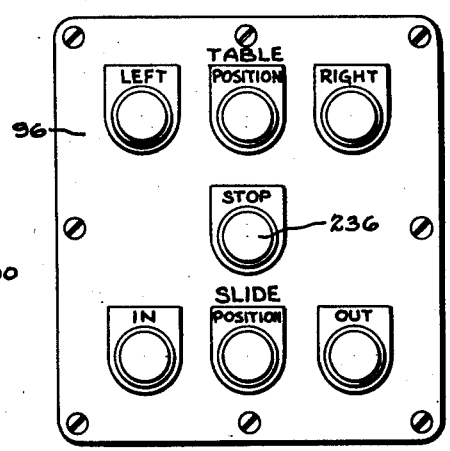
Figure 20 is a top plan view of the switch box showing the arrangement of the push buttons for manual control and automatic positioning of the cross slide and table.

The movements executed by the table or slide, as the case may be, are indicated in the motion diagram illustrated in Figure 21; duplicate movements are performed by the slide and table except that the table rapid traverse rate is greater. In the motion diagram, the arrow indicated at L represents the movement of the table to the left under manual operation of the left push button at the control station (Figure 20). Since the table control unit 49 is located at the right end of the slide, automatic operation of the table under automatic rapid traverse and positioning speeds always is to the right, that is, toward the measuring rods. Therefore, in setting up the machine for inserting the duplicating rods, the table is shifted to the left although it can also be shifted to the right manually by depressing the Right push button. It is to be observed at this point that manual control by operation of the push buttons energizes the rapid traverse motors only, leaving out of the circuit the final positioning motors.

When the table has been moved sufficiently to the left, the measuring rods are placed in the channel and the machine may be placed under automatic positioning by depressing the button labeled Position, which immediately starts the table movement toward the right. As shown in the motion diagram, the table will rapid traverse at 72 inches per minute toward the right until it displaces the measuring rods sufficiently to trip the rapid traverse switch 152. This switch plugs to a stop the rapid traverse motor and places in operation the positioning motor which continues advancing the table toward the left at the rate of .415 inch per minute. In the present example, the table advances at rapid traverse speed until it comes within $\frac{1}{16}''$ of its final indexing position which coincides with the hole center. Upon reaching this point, positioning switch 153 is tripped by measuring rod movement to plug the positioning motor and then to reverse its direction of rotation for a sufficient number of turns to relieve the screw shaft but without reversing the movement of the table, as heretofore outlined. The table is then clamped in fixed position for the boring operation. The above outlined mode of operation is identically the same in connection with the movements of the slide except that the rapid traverse slide rate is 36 inches per minute due to its shorter travel range.

The electrical circuit disclosed in Figure 22 is representative of one of several arrangements which may be utilized in operating the rapid traverse and positioning motors in response to the push buttons and automatic positioning control units. Since the table and slide circuits are substantially identical, the following detailed description of the table circuit applies also to the slide circuit. The various electrical components of the system are commercial products. The contacts operated by the relay and timer coils are placed in the lines which the contacts control for convenience in tracing the circuit. In order to correlate the relay coils with the contacts operated by them, the various coils are indicated alongside the diagram together with their contacts which are placed in horizontal alignment with the positions they occupy in the circuit.

The control circuit is energized by the transformer 210 having one lead 211 connected in common to one terminal of all of the relay coils. The second lead 212 from the transformer completes the circuit to the relay coils of the rapid traverse motors by way of the manual control buttons Left and Right and also for automatic positioning in the right hand direction. When the Left push button is depressed, a circuit is established from line 212 to line 213 through the normally closed contact R-1 through the normally closed Safety switch to the L relay winding. This winding closes the L motor contacts which connect the three phase power lines 214 to the traverse motor 45 in a direction to traverse the table toward the left. This operation continues only so long as the Left push button is held manually in depressed position.

When the Right push button is depressed, a circuit is established from line 212 through the normally open contacts of the push button, through rapid traverse switch 152 of the control unit to relay coil R-1 by way of line 215. Energizing this relay closes the R contacts, causing the rapid traverse motor to drive the table toward the right. The right hand table movement continues so long as the R push button is held down. In order to prevent the table from being traversed beyond its limits of travel, there is provided a right and left hand table safety switch indicated at 216 and 217 which are inserted respectively in the lines 212 and 213. These switches open the circuit and deenergize the motor when either switch is tripped by the table even though the push buttons are held down. These switches may be mounted upon the table at opposite ends with their operating stems in position to be engaged by the trip fingers 218 at the limits of travel, as indicated in Figure 3. Since the arrangement is well known in the art, the structural details have been omitted from the drawings.

When the Table Position push button of the switch box is depressed, a circuit is established from line 212, through normally closed contacts CR-2 and by way of line 229 to control relay CR-1. When this relay is energized, it closes a holding contact CR-1, by-passing the Position switch. This contact, when closed, provides a holding circuit to maintain relay CR-1 in energized position after the positioning button is released. Upon being energized, CR-1 also closes contact CR-1 interposed in line 215, by-passing the Right push button, and this contact energizes by way of line 215 the rapid traverse relay R-1. This relay closes the power contacts R of the rapid traverse motor causing the motor to traverse the table toward the right in the same manner as under Right push button operation, as above outlined. Relays L and R-1 are interlocked mechanically to provide alternate operation, as indicated at 221.

Since relay CR-1 is locked in circuit by way of its holding contact, CR-1 in line 220, the rapid traverse motor will continue traversing the table toward the right until the measuring rods are contacted, reversing the position of the rapid traverse switch 152 in line 215. This switch is a single pole, double throw micro-switch which is snapped from the position shown to its opposite position upon predetermined movement of the control unit plunger 150 by the measuring rods, as previously described. When switch 152 is tripped, the circuit to relay R-1 by way of line 215 is broken and a circuit is established from line 212 by way of line 222 through closed contact CR-1, line 223 to control relay CR-2, relay R-2 and time delay relay TR-1, closing the R-2 contacts of positioning motor 47. At the same time, a plugging circuit to stop or plug the rapid traverse motor is established by the Plug Relay.

It will be observed at this point that the table is traversed by rotation of its screw shaft so long as relay R-1 or L is energized since these relays control in either direction the operation of the rapid traverse motor 46. When switch 152 is tripped and the rapid traverse motor plugged to a stop, the positioning motor at the same time is energized causing rotation of the table splined shaft to produce the final positioning movement of the table in the same direction.

The Plug Relay for the rapid traverse motor 46 is a standard unit well known in the electrical industry and, for this reason, its entire circuit is not illustrated. In general, this relay responds to the ripple current generated by the motor during plugging and, as indicated, two of its terminals are connected by the leads 228 and 230 to the ripple terminals of the motor in the usual manner. When switch 152 is tripped, deenergizing relay R-1, the power contacts R open and the normally closed interlock contact R-1 in line 213 assumes its closed position, as shown. This contact establishes a circuit from the contact 224 of the Plug Relay by way of line 225 through normally closed contact R-1, and normally closed safety switch 217 to relay L. This closes contacts L of the power circuit to the rapid traverse motor for plugging. The Plug Relay is connected by line 226 to the rapid traverse contact 227 of switch 152, and the relay is arranged to close its contact 224 when contact 227 opens. After closing, a holding circuit for the plug relay contact 224 is established by way of the ripple leads 228 and 230, which is arranged to open contact 224 when the ripple current drops to a pre-set value. When relay L closes, its contact L in the ripple line 230 closes to complete the ripple circuit from the motor to the relay and momentarily the motor armature rotates under momentum opposing its reversed field under plugging action. The contact 224 is held closed by the ripple current until the armature is about to reverse itself, at which point the ripple current falls sufficiently to open contact 224 and deenergize relay L, bringing the motor to a stand-still.

As above noted, the table positioning motor 47 is energized immediately when switch 152 is tripped and this motor continues running until the table approaches its final position. The circuit for the positioning motor is established by the R-2 contacts which connect the motor to the power lines. As soon as relays R-2, CR-2 and TR-1 are energized, the contact CR-2 in line 223 closes to establish a holding circuit from line 212 through control unit switch 153, through contacts CR-2 to the winding of relay CR-2, R-2 and TR-1. When CR-2 is energized, its interlock contact CR-2 in line 220 is opened, thereby deenergizing relay CR-1 and opening its holding contact CR-1 in line 220. This also opens the traverse motor contact CR-1 in line 215.

The positioning motor will continue to inch the table forwardly since the holding contact CR-2 in line 223 holds relays CR-2, R-2 and delay relay TR-1 in energized position with the positioning motor power contacts R-2 closed for right positioning movement of the table. This movement continues for approximately $\frac{1}{16}''$, as above noted, then the final position switch 153 is tripped from the position shown by the final inching of the measuring rods against plunger 150 of the control unit. When switch 153 is tripped, the circuit from line 212 to line 222 is broken, causing relays CR-2, R-2 and TR-1 to be deenergized and at the same time a circuit is established from the second contact 231 of switch 153 to line 232, through closed contact TR-1 to the Plug Relay. The plugging relay closes the reversing power contacts P of the positioning motor 47, causing reverse rotation of the motor armature to relieve stress on the screw shaft.

The number of reverse rotations is determined by the setting of the time delay relay TR-1 which maintains its contact TR-1 closed for a predetermined interval after its coil is deenergized. When switch 153 is tripped, the circuit is completed immediately to the Plug Relay through closed contact TR-1 while, at the same time, relay R-2 and CR-2 are deenergized to open the power contacts R-2 so that the positioning motor armature is immediately braked and reversed by the closed power contacts P of the Plug Relay. Reverse rotation continues until the time delay relay TR-1 opens its contact TR-1, at which point the plugging relay opens the power contacts P, allowing the positioning motor armature to stop.

This reverse armature rotation continues for approximately nine revolutions, as determined by the setting of the time delay relay, which as above noted is just sufficient to unstress the screw shaft and take up approximately one-half the back lash in the reduction gearing. The table is now stationary at its final position and is clamped to the slide for the boring operation. The time delay relay TR-1 is a standard unit and its time interval may be adjusted precisely to provide a sufficient lag to drive the armature in reverse to permit it to coast to a stop for the required number of unloading turns. In addition to the switches 152 and 153 in the control units, the safety switch 154 of each unit is interposed in line 237 to normally energize the safety relay S. The normally closed contacts S of this relay are interposed in the power lines 214 so as to deenergize the power lines and prevent damage to the control unit and associated parts if the switches or relays which regulate right hand movement of the table should stick or fail.

The slide control circuit is a duplicate of the table control circuit and, for this reason, need not be described in detail. Since the slide moves transversely, the manually operated push button switches and the directional relays are indicated as In and Out. In operation, both circuits can be energized at the same time to cause the table and the slide simultaneously to index their respective positions, thereby speeding up the positioning cycle. As indicated, the slide rapid traverse and positioning motors 44 and 45 are controlled by power contacts which connect the motor leads to the power lines 214 for In and Out slide movements.

The control circuit for the slide is energized by way of line 233 which extends to the transformer lead 212 and the several control unit switches 152, 153 and 154 and control relays bear the same relationship with one another as in the table circuit, duplicate numerals being applied to the duplicate switches. The slide is also provided with safety limit switches indicated at 234 and 235, which are tripped by the slide at its limits of translation. The emergency push button stop switch of the switch box 236 (Figure 20) is interposed in the transformer line 212 and thus deenergizes the circuit for both the table and slide upon being depressed. This causes the holding relays to open their circuits, bringing the motors immediately to a stop and preventing operation until the circuit is reestablished by the directional or positioning push buttons.

The traverse and positioning speeds for the slide and table, as disclosed in the specification and drawings, are intended only to illustrate typical operating characteristics of the invention as applied to a jig boring machine of a given class, as a preferred embodiment of the invention. It will be apparent that these factors necessarily will vary in accordance with the requirements of various machines to which the apparatus is applied and that such alterations can readily be made without substantial changes in the structure disclosed.

Having described our invention, we claim:

1. An apparatus for positioning a movable member to an accurate position comprising a support member, a rapid traverse motor mounted on the support member, a screw shaft rotatably mounted on the support member and in driving connection with the said rapid traverse motor, a nut rotatably mounted on the movable member and in threaded engagement with the screw shaft adapted to shift the movable member at a rapid traverse rate upon rotation of the screw shaft, a positioning motor mounted upon the support member, and driving means extending from the positioning motor to the said nut adapted to rotate the nut relative to the screw shaft at a rate less than the rotation of the screw shaft by the rapid traverse motor.

2. An apparatus for positioning a movable member to an accurate position comprising a support member, a rapid traverse motor mounted on the support member, a screw shaft rotatably mounted on the support member and in driving connection with the said rapid traverse motor, a nut rotatably mounted on the movable member and in threaded engagement with the screw shaft adapted to shift the movable member at a rapid traverse rate upon rotation of the screw shaft, a positioning motor mounted upon the support member, driving means extending from the positioning motor to the said nut adapted to rotate the nut relative to the screw shaft at a rate less than the rotation of the screw shaft by the rapid traverse motor, and automatic means responsive to the advancement of the movable member operable to stop the rapid traverse motor after a predetermined advancement of the movable member and to energize the positioning motor until the movable member reaches its final position.

3. In an apparatus for shifting a movable member to an accurate position with respect to a support member, a rapid traverse motor mounted on the support member, a screw shaft in driving connection with said rapid traverse motor, a nut mounted on the movable member and in threaded engagement on the said screw shaft adapted to shift the movable member at a rapid traverse rate upon rotation of the screw shaft, a final positioning motor mounted on the support member, a final positioning shaft in driving connection with the said motor and disposed substantially in parallelism with the said screw shaft, a driving element slidably engaged on the final positioning shaft, and driving means extending from the driving element to the said nut adapted to rotate the nut relative to the screw shaft at a rate less than the rotation imparted to the screw shaft by the rapid traverse motor.

4. In an apparatus for shifting a movable member to an accurate position with respect to a support member, a rapid traverse motor mounted on the support member, a screw shaft, a driving connection between the rapid traverse motor and screw shaft constructed and arranged to lock the screw shaft against rotation when the said motor is stationary, a nut mounted on the movable member and in threaded engagement on the said screw shaft adapted to shift the movable member at a rapid traverse rate upon rotation of the screw shaft, a final positioning motor mounted on the support member, a final positioning shaft in driving connection with the said motor and disposed substantially in parallelism with the said screw shaft, a driving element slidably engaged on the final positioning shaft, and a speed reduction unit connecting the driving element to the nut for rotating the nut relative to the screw shaft at a rate less than the rotation of the screw shaft by the rapid traverse motor, the speed reduction unit being constructed and arranged to lock the nut against rotation when the final positioning motor is stationary.

5. In an apparatus for shifting a movable member to an accurate position with respect to a support member, a rapid traverse motor mounted on the support member, a screw shaft, a worm driven by the rapid traverse motor, a worm wheel mounted on the screw shaft meshing with said worm, a nut mounted on the movable member and in threaded engagement on the said screw shaft adapted to shift the movable member at a rapid traverse rate upon operation of the rapid traverse motor, a final positioning motor mounted on the support member, a final positioning shaft in driving connection with the final positioning motor and substantially parallel with the said screw shaft, a worm slidably engaged on the final positioning shaft, a worm wheel meshing with said worm, a second worm mounted on the worm wheel, and a second worm wheel mounted on the nut and meshing with the said second worm adapted to rotate the nut at the rate less than the rotation of the screw shaft by the rapid traverse motor upon operation of the final positioning motor.

6. In an apparatus for shifting a movable member to an accurate position with respect to a support member, a rapid traverse motor mounted upon the support member, a screw shaft, a worm driven by the rapid traverse motor, a worm wheel mounted upon the screw shaft and in mesh with said worm, a final positioning motor mounted on the support member, a positioning shaft in driving connection with the positioning motor and substantially parallel with the screw shaft, a worm box secured upon the movable member and traversed by the screw shaft and positioning shaft, a transmission shaft journalled within the worm box substantially at right angles to the screw and positioning shafts, a worm wheel mounted on the transmission shaft, a worm slidably engaged on the positioning shaft within the worm box and in mesh with the worm wheel, a second worm on the transmission shaft, and a nut including a worm wheel confined within the worm box and threaded upon the screw shaft, the worm wheel of the nut being in mesh with the second worm to provide a reduction drive between the positioning shaft and nut operable to rotate the nut at a rate less than the rotation of the screw shaft by the rapid traverse motor to provide a relatively slow speed during the final positioning of the movable member.

7. An apparatus for positioning automatically a movable member with respect to the support member of a machine tool or the like comprising, a rapid traverse motor mounted upon the support member, a screw shaft in driving connection wtih the rapid traverse motor, a final positioning motor mounted on the support member, a positioning shaft extending substantially parallel with the said screw shaft and in driving connection with the final positioning motor, a worm box mounted upon the movable member, a rotatable nut mounted within the worm box and in threaded engagement upon the screw shaft, a nut driving element including a speed reduction system slidably engaged on the positioning shaft and in driving connection with the rotatable nut, the said speed reduction system being constructed and arranged to rotate the nut at a rate less than the rotation of the screw shaft, a control system including manually operated switches operable to energize the rapid traverse motor in either direction, means in the control system responsive to the said manually operated switches to energize the rapid traverse motor and initiate an automatic positioning cycle, and an automatic control unit including switches responsive to the shiting of the movable member, the said switches being interconnected in the control system and arranged to deenergize the rapid traverse motor and energize the final positioning motor when the movable member approaches its final position and to deenergize the positioning motor when the movable member reaches final position.

8. In an apparatus for positioning a movable member with respect to the bed of a machine tool or the like, a screw shaft, a positioning shaft extending substantially parallel with the said screw shaft, a rotatable nut mounted upon the movable member and in threaded engagement upon the screw shaft, a nut driving element slidably engaged on the positioning shaft, driving means in connection between the driving element and nut, the said driving means being arranged to rotate the nut with the screw shaft stationary upon rotation of said positioning shaft, the said screw shaft and positioning shaft being adapted to advance the movable member at differential rates upon individual rotation thereof, respective motor means in driving connection with said screw shaft and said positioning shaft, said motor being arranged to rotate alternately the screw shaft and positioning shaft upon alternate energization of said motor means, and an automatic control system for regulating the alternate energization of said motor means in response to the advancement of the movable member, the said control system being constructed and arranged to cause rapid advancement of the movable member to a given position by rotation of one of the said shafts and to cause slow advancement to final position by rotation of the other of said shafts.

9. In an apparatus for positioning a movable member to an accurate position with respect to a support member, a rapid traverse motor, a screw shaft in driving connection with the said rapid traverse motor, a nut mounted on the movable member and in threaded engagement with the screw shaft adapted to shift the movable member at a rapid traverse rate upon rotation of the screw shaft, a positioning motor, a positioning shaft residing in spaced parallel relationship to said screw shaft and in driving connection with said positioning motor, a driving connection between the positioning shaft and the said nut adapted to rotate the nut relative to the screw shaft at a rate less than the rotation of the screw shaft by the rapid traverse motor, an automatic control system constructed and arranged to regulate the operation of the traverse and positioning motors, means in the control system responsive to the advancement of the movable member to stop the rapid traverse motor after a predetermined advancement of the movable member and to energize the positioning motor until the movable member reaches its final position, and means in the control system operable to reverse the positioning motor at the final position of the movable member for a period sufficient to introduce back lash between the said nut and screw shaft but insufficient to displace the movable member from its final position.

10. In an apparatus for positioning automatically a movable member with respect to a support member, a rapid traverse motor, a rapid traverse screw in driving connection with the said motor, a positioning motor, a positioning shaft substantially parallel with the screw shaft and in driving connection with the positioning motor, a driving unit mounted upon the movable member and traversed by the screw and positioning shafts, means in the driving unit including a nut threaded on the screw shaft adapted to traverse the screw shaft upon rotation of the screw shaft by the rapid traverse motor with the nut stationary and adapted to be rotated at a reduced rate by the positioning shaft upon operation of the positioning motor with the rapid traverse motor and screw shaft stationary, an automatic control system including a pair of switches responsive to the movement of the movable element, the first of said switches being adapted to deenergize the rapid traverse motor and energize the positioning motor when the movable element approaches its final position, the second of said switches being operable to deenergize the positioning motor at the final position of the movable member, a safety switch in the control system for deenergizing the positioning motor upon advancement of the movable member beyond the final position controlled by the second switch of the automatic control system, and a second safety switch in the control system adapted to deenergize the rapid traverse and final positioning motors at the limits of travel of the movable member.

11. In an apparatus for shifting automatically a movable member to an accurate position with respect to a support member, a rapid traverse motor mounted on the support member, a screw shaft in driving connection with the rapid traverse motor, a nut rotatably mounted on the movable member and in threaded engagement with said screw shaft, the nut adapted to traverse the movable member at a relatively fast rate to a predetermined approach position with respect to its final position upon rotation of the screw shaft by said rapid traverse motor, a final positioning motor mounted on the support member, a positioning shaft in driving connection with the said positioning motor, driving means from said positioning shaft to said nut adapted to rotate the nut and shift the movable member at a relatively slow rate from the predetermined approach to its final position upon rotation of the positioning shaft, a control unit mounted on the support member for regulating automatically the operation of the rapid traverse and final positioning motors, a slidable preloaded switch actuating plunger in said control unit, means interposed between the plunger and the movable member operable to depress the said plunger upon shifting of the movable member toward the plunger, a pair of switches mounted in the control unit, means connecting the shiftable switch actuating plunger to the switches for tripping the said switches in sequence upon depression of the plunger by the movable member, the first of said switches being interconnected with the rapid traverse and positioning motors and operable to deenergize the rapid traverse motor and energize the positioning motor at the predetermined approach position of the movable member, and the second of said switches being interconnected with the positioning motor and operable to deenergize the positioning motor at the final position under predetermined pressure of the movable member.

12. In an apparatus for shifting automatically a movable member to an accurate position with respect to a support member, a rapid traverse motor adapted to traverse the movable member at a relatively fast rate to a predetermined approach position with respect to its final position, a final positioning motor adapted to shift the movable member at a relatively slow rate from the predetermined approach to its final position, a control unit mounted on the support member for regulating automatically the operation of the rapid traverse and final positioning motors, a slidable switch actuating plunger in said control unit, means interposed between the plunger and the movable member operable to depress the said plunger upon shifting of the movable member toward the plunger, a switch mounted in the control unit adapted to be tripped by the said shiftable switch actuating plunger upon predetermined depression thereof, the said switch being interconnected electrically with the rapid traverse and positioning motors and adapted to energize the positioning motor and deenergize the rapid traverse motor at said predetermined approach position of the movable member, a second switch mounted in the said control unit, a lever pivotally mounted in the control unit having its free end disposed in operating relationship with the second switch, an abutment on the said plunger adapted to engage and swing the lever upon advanced depression of the said plunger and thereby to trip the second switch in sequence to the first switch, the said second switch being interconnected electrically with the positioning motor to deenergize the motor and stop the movable member automatically at final position.

13. A positioning device for a machine tool of the type having a bed, a table movable upon said bed, and means including a relatively rotatable nut and lead screw for effecting said translation upon said bed, a rotatable positioning shaft residing in spaced parallel relationship to said lead screw, a driving connection from said positioning shaft to said nut adapted to rotate the nut upon rotation of the positioning shaft, said positioning device including power means for effecting rotation of said lead screw in relation to said nut, second power means for effecting rotation of said positioning shaft and nut in relation to said lead screw, one of said power means being effective when energized to drive the table at a given rate of speed in a given direction, the other of said power means being effective when energized to translate said table at a slower rate of speed in the same direction, a controller for energizing one of said power means to initiate table movement, a control device responsive to movement of the table for initiating energization of the other of the power means upon movement of the table to a given position at the slower rate of movement, and a second control device responsive to table movement to a predetermined position for decommissioning the said other of said power means.

14. A positioning device for a machine tool of the type having a bed, a table movable upon said bed, and means including a relatively rotatable nut and lead screw for effecting said translation upon said bed, a rotatable positioning shaft residing in spaced parallel relationship to said lead screw, a driving connection from said positioning shaft to said nut adapted to rotate the nut upon rotation of the positioning shaft, said positioning device including an electric motor for effecting rotation of said lead screw in relation to said nut, second electric motor for effecting rotation of said positioning shaft and nut in relation to said lead screw, one of said electric motors being effective when energized to drive the table at a given rate of speed in a given direction, the other of said electric motors being effective when energized to translate said table at a slower rate of speed in the same direction, a manually operated switch for energizing one of said electric motors to initiate table movement, an automatic switch responsive to movement of the table for initiating energization of the other of the electric motors upon movement of the table to a given position at the slower rate of movement, and a second automatic switch responsive to table movement to a predetermined position for decommissioning the said other of said electric motors.

15. A machine tool comprising, a bed having table ways, a table slidable upon said ways, a nut carried by said table, said nut being rotatable and being restrained against axial movement relative to said table, a screw shaft rotatably journalled on said bed and residing in threaded connection with said nut for moving the table by screw rotation, a second shaft independently rotatably journalled on said bed, a driving connection from said second shaft to said nut for rotating said nut relative to the said screw shaft which engages said nut for moving the table by nut rotation, means for maintaining the driving connection between said second shaft and said nut during movement of said table in consequence of rotation of said second shaft, and motor means for selectively rotating said screw shaft and said second shaft.

16. A machine tool comprising, a bed having table ways, a table slidable upon said ways, a nut carried by said table, said nut being rotatable and being restrained against axial movement relative to said table, a screw shaft rotatably journalled on said bed and residing in threaded connection with said nut for moving the table by screw rotation, a second shaft residing in spaced parallel relation to the first shaft, independently rotatably journalled on said bed and driving connection from said second shaft to said nut for rotating said nut relative to the said screw shaft which engages said nut for moving the table by nut rotation, means for maintaining the driving connection between said second shaft and said nut during movement of said table in consequence of rotation of said second shaft, and motor means for selectively rotating said screw shaft and said second shaft.

17. A machine tool comprising, a bed having table ways, a table slidable upon said ways, a nut carried by said table, said nut being rotatable and being restrained against axial movement relative to said table, a screw shaft rotatably journalled on said bed and residing in threaded connection with said nut for moving the table by screw shaft rotation, a second shaft independently rotatably journalled on said bed, a driving connection from said second shaft to said nut for rotating said nut relative to the said screw shaft which engages said nut for moving the table by nut rotation, means for maintaining the driving connection between said second shaft and nut during movement of said table in consequence of rotation of said second shaft, motor means for selectively rotating and said screw shaft said second shaft, and means responsive to the movement of the table to a predetermined position for relieving the rotatable nut and screw shaft interconnection of strains which are residual therein in consequence of their driving operation during energization of said motor means.

References Cited in the file of this patent

UNITED STATES PATENTS

| Number | Name | Date |
| --- | --- | --- |
| 2,333,341 | Scrivener | Nov. 2, 1943 |
| 2,370,701 | Woodbury | Mar. 6, 1945 |
| 2,420,024 | Woodbury | May 6, 1947 |
| 2,481,477 | Peery | Sept. 6, 1949 |
| 2,520,014 | Rehnberg et al. | Aug. 22, 1950 |